(12) United States Patent
Herron

(10) Patent No.: US 8,585,806 B2
(45) Date of Patent: Nov. 19, 2013

(54) GAS SEPARATION MEMBRANE

(75) Inventor: John R. Herron, Corvallis, OR (US)

(73) Assignee: Hydration Systems, LLC, Scottsdale, AZ (US)

(*) Notice: Subject to any disclaimer, the term of this patent is extended or adjusted under 35 U.S.C. 154(b) by 49 days.

(21) Appl. No.: 13/348,640

(22) Filed: Jan. 11, 2012

(65) Prior Publication Data
US 2012/0174791 A1 Jul. 12, 2012

Related U.S. Application Data

(60) Provisional application No. 61/431,534, filed on Jan. 11, 2011.

(51) Int. Cl.
*B01D 53/22* (2006.01)
(52) U.S. Cl.
USPC .............. 96/11; 95/43; 95/45; 96/4; 96/7; 210/652
(58) Field of Classification Search
USPC .............. 95/43, 45; 96/4, 7, 11; 210/652
See application file for complete search history.

(56) References Cited

U.S. PATENT DOCUMENTS

| | | | |
|---|---|---|---|
| 3,133,132 A | 5/1964 | Loeb et al. | |
| 3,648,845 A | 3/1972 | Riley | |
| 4,230,463 A | 10/1980 | Henis et al. | |
| 6,579,948 B1 | 6/2003 | Tan et al. | |
| 7,307,127 B1 | 12/2007 | Napadensky et al. | |
| 7,490,725 B2* | 2/2009 | Pinnau et al. | 210/490 |
| 2001/0009717 A1* | 7/2001 | Higashiyama et al. | 428/318.8 |
| 2002/0035922 A1* | 3/2002 | Nakanishi et al. | 95/52 |
| 2002/0046970 A1* | 4/2002 | Murase et al. | 210/483 |
| 2002/0104439 A1* | 8/2002 | Komkova et al. | 96/4 |
| 2002/0197413 A1* | 12/2002 | Daido et al. | 427/430.1 |
| 2003/0038081 A1 | 2/2003 | Wang et al. | |
| 2004/0142910 A1 | 7/2004 | Vachon et al. | |
| 2005/0077243 A1* | 4/2005 | Pinnau et al. | 210/652 |
| 2007/0298067 A1 | 12/2007 | Kangas | |
| 2008/0050415 A1 | 2/2008 | Atanasoska et al. | |
| 2010/0206811 A1 | 8/2010 | Ng et al. | |
| 2012/0000846 A1* | 1/2012 | Herron | 210/500.29 |
| 2012/0175300 A1* | 7/2012 | Herron | 210/500.32 |
| 2012/0231535 A1* | 9/2012 | Herron et al. | 435/290.1 |
| 2013/0134093 A1* | 5/2013 | Herron et al. | 210/644 |

OTHER PUBLICATIONS

Notice of Transmittal of the International Search Report and the Written Opinion of the International Searching Authority for PCT Application No. PCT/US2012/028497 dated Jul. 27, 2012 (11pp).
International Preliminary Report on Patentability from the International Bureau of WIPO dated Jul. 16, 2013 for PCT Application No. PCT/US2012/028497, pp. 1-9.

* cited by examiner

*Primary Examiner* — Jason M Greene
*Assistant Examiner* — Anthony Shumate
(74) *Attorney, Agent, or Firm* — Fennemore Craig, P.C.

(57) ABSTRACT

A method of forming a gas separation membrane including: depositing a first hydrophilic polymer solution; depositing on top of the first hydrophilic polymer solution a second, different hydrophilic polymer solution, thereby forming a two-layer polymer solution; forming the two-layer polymer solution into one of a forward osmosis membrane and a pressure retarded osmosis membrane by bringing the second, different hydrophilic polymer solution into contact with water to form the dense layer; coating one of the forward osmosis membrane and the pressure retarded osmosis membrane with a thin layer of a third, different, hydrophilic polymer more pH tolerant than the first and second hydrophilic polymer solutions to form a dense rejection layer thereon; and exposing one of the coated forward osmosis membrane and the coated pressure retarded osmosis membrane to a high pH solution. A gas separation membrane formed from the foregoing process.

20 Claims, No Drawings

GAS SEPARATION MEMBRANE

CROSS-REFERENCE TO RELATED APPLICATION

This application claims priority to the pending provisional application entitled "GAS SEPARATION MEMBRANE", Ser. No. 61/431,534, filed Jan. 11, 2011, the entire disclosure of which is hereby incorporated herein by reference.

BACKGROUND

1. Technical Filed

This document relates to gas separation membranes.

2. Background

Membrane gas separations have been increasing in importance since the 1980s. One application of particular interest is the removal of CO2 from natural gas. Many natural gas sources are too high in CO2 to be allowed into the natural gas pipeline grid.

The most common membrane used in removal of CO2 from natural gas is cellulose triacetate (CTA) formed by the immersion precipitation process (U.S. Pat. No. 4,243,701, Riley et al. 1981). This membrane has permeability to CO2 about 15 times higher than that to methane. When natural gas is pressurized against one side of the membrane, CO2 preferentially passes through the membrane and the retentate gas is purified. A membrane separation of the permeate gas can recapture essentially all the methane.

An issue with CTA membranes for gas separations is the membranes are only pliable in the wet state. For CTA to be used in gas separations, after rolling into an element, the membrane must be dried in a two-step process. After drying the membrane becomes brittle and many failures in the field are due to membrane cracking There are membranes made from other cellulose esters that are more rubbery and pliable when dried. Cellulose acetate butyrate (CAB) has been shown to be more rugged in gas separations but its performance is lower than that of CTA and it is not used commercially.

Regardless, any conventional two-layer membranes in use are all made by applying a coating to an existing membrane.

SUMMARY

Aspects of this document relate to a gas separation membrane and process. These aspects may include, and implementations may include, one or more or all of the components and steps set forth in the appended CLAIMS, which are hereby incorporated by reference.

In one aspect, a method of forming a gas separation membrane by immersion precipitation and hydrolysis is disclosed and includes: depositing a first hydrophilic polymer solution with a formulation optimized to produce a high performance porous layer; depositing on top of the first hydrophilic polymer solution a second, different hydrophilic polymer solution optimized to produce a high performance dense layer, thereby forming a two-layer polymer solution; forming the two-layer polymer solution into one of a forward osmosis membrane and a pressure retarded osmosis membrane by bringing the second, different hydrophilic polymer solution into contact with water to form the dense layer; coating one of the forward osmosis membrane and the pressure retarded osmosis membrane with a thin layer of a third, different, hydrophilic polymer more pH tolerant than the first and second hydrophilic polymer solutions to form a dense rejection layer thereon; and exposing one of the coated forward osmosis membrane and the coated pressure retarded osmosis membrane to a high pH solution, thereby rendering the porous and dense layers more open by hydrolysis.

In another aspect, a gas separation membrane is disclosed and includes: a porous layer formed from a first hydrophilic polymer solution by immersion precipitation and from hydrolysis with a formulation optimized to produce a high performance porous layer; a dense layer on top of and supported by the porous layer, the dense layer formed from a second, different hydrophilic polymer solution by immersion precipitation and from hydrolysis and optimized to produce a high performance dense layer; and a dense rejection layer applied onto the dense layer and formed from a third hydrophilic polymer more pH tolerant than the first and second hydrophilic polymer solutions.

The foregoing and other aspects, features, and advantages will be apparent to those of ordinary skill in the art from the DESCRIPTION and DRAWINGS, and from the CLAIMS.

DESCRIPTION

This document features a gas separation membrane. The gas separation membrane has the performance of a CTA membrane but with the improved durability of CAB membrane. The gas separation membrane is made by creating a layered polymer solution that is then formed into a membrane, which is in stark contrast to applying a coating to an existing membrane as is the case for conventional two layer membranes.

There are many features of gas separation membrane implementations disclosed herein, of which one, a plurality, or all features or steps may be used in any particular implementation. In the following description, it is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

There are a variety of gas separation membrane implementations and related processes. Notwithstanding, for the exemplary purposes of this disclosure, a process of forming gas separation membrane implementations may generally include casting a two-layer membrane by the immersion precipitation process to produce a pliable membrane with the performance of CTA membranes but with the improved durability of CAB membranes.

The technique for forming a layered polymer solution that is then formed into a membrane is complicated. The keys are recognizing: 1) The structure of the porous layer is critically important to FO flux and gas membrane durability and it varies widely between CA, CAB and CTA; 2) All three cellulose esters are soluble in similar solvents and if brought into contact in layers they will not precipitate until the top layer is contacted with water; and 3) In the immersion precipitation process a dense layer will only form on the top layer. All layers below the surface layer will form a porous layer exclusively. This porous layer should have the structure typical to the polymer it is made of.

Immersion Precipitation

In order to achieve optimal dense layer and porous layer performance simultaneously, two-layer membranes must be cast. The immersion precipitation process used here is similar to that disclosed in U.S. Pat. No. 31,331,324 to Loeb and Sourirajan, the disclosure of which is hereby incorporated entirely herein by reference.

For the exemplary purposes of this disclosure, the process can entail forming a layer of CAB polymer solution then depositing a thin layer of CTA polymer solution on top of it. The two-layer polymer solution is then air treated and the CTA layer is brought into contact with water. The dense layer will form from CTA and most of the porous layer will be formed from CAB.

A membrane polymeric material (e.g., hydrophilic polymer (e.g. cellulose ester)) is dissolved in water-soluble solvent (non-aqueous) system to form a solution. Appropriate water-soluble solvent systems for cellulosic membranes include, for example, (e.g. ketones (e.g., acetone, methyl ethyl ketone and 1,4-dioxane), ethers, alcohols). Also included/mixed in the solution are pore-forming agents (e.g. organic acids, organic acid salts, mineral salts, amides, and the like, such as malic acid, citric acid, lactic acid, lithium chloride, and the like for example) and strengthening agents (e.g., agents to improve pliability and reduce brittleness, such as methanol, glycerol, ethanol, and the like for example).

Thus, in one implementation, CAB is dissolved in water-soluble solvent (non-aqueous) system to form a first solution.

Next, a thin layer of CTA polymer solution may be deposited on top of the first CAB solution.

Next, a thin layer of the viscous two-layer solution can be placed or spread evenly on a surface and allowed to air dry for a short time.

Then the CTA layer side of the viscous two-layer solution is brought into contact with water. The water contact causes the membrane components to coagulate and form the appropriate membrane characteristics (e.g., porosity, hydrophilic nature, asymmetric nature, and the like). Thus, the water contact causes the polymer in solution to become unstable and a layer of dense polymer precipitates on the surface very quickly. This layer acts as an impediment to water penetration further into the solution so the polymer beneath the dense layer precipitates much more slowly and forms a loose, porous matrix. The dense layer will form from CTA and most of the porous layer will be formed from CAB. The dense layer is the portion of the membrane that has selective transport of methane and CO2 while blocking other species. The porous layer acts merely as a support for the dense layer. The support layer is needed because on its own a 10 micron thick dense layer, for example, would lack the mechanical strength and cohesion to be of any practical use.

After all the polymer is condensed from solution the membrane can be washed and heat treated.

Thus, the immersion/precipitation process may form an asymmetric membrane with a solid dense or skin layer of CTA as a surface component, having about 5-15 micrometers in thickness for example. Also formed is a porous or scaffold layer of mostly CAB, wherein the porous or scaffold layer is highly porous and allows diffusion of solids within the porous or scaffold layer. The porous or scaffold layer may have a thickness of 20 to 150 microns for example. The dense or skin layer and the porous or scaffold layer created by the immersion/precipitation process have their porosities controlled by both the casting parameters and by the choices of solvent and ratio of solids of polymeric material to solvent solution. The porous or scaffold layer may have a density of polymer as low as possible, such as from about 15-30% polymer by volume. The top dense or skin layer may have a density of polymer of greater than 50% polymer.

Many additional implementations are possible.

For the exemplary purposes of this disclosure, in one implementation the two layer polymer solution may be extruded onto a surface of a hydrophilic backing material. An air-knife may be used to evaporate some of the solvent to prepare the solution for formation of the dense or skin layer. The backing material with solution extruded on it is then introduced into a coagulation bath (e.g., water bath). The water bath causes the membrane components to coagulate and form the appropriate membrane characteristics (e.g., porosity, hydrophilic nature, asymmetric nature, and the like). In an FO process, water transport occurs through the holes of the mesh backing layer as the mesh backing fibers do not offer significant lateral resistance (that is, the mesh backing does not significantly impede water getting to surface of membrane). The membrane may have an overall thickness from about 10 micrometers to about 150 micrometers (excluding the porous backing material) for example. The porous backing material may have a thickness of from about 50 micrometers to about 500 micrometers in thickness for example.

For the exemplary purposes of this disclosure, in another implementation the two layer polymer solution may be cast onto a rotating drum and an open fabric is pulled into the solution so that the fabric is embedded into the solution. The solution is then passed under an air knife and into the coagulation bath. The membrane may have an overall thickness of 75 to 150 microns and the support fabric may have a thickness from 50 to 100 microns. The support fabric may also have over 50% open area. The support fabric may be a woven or nonwoven nylon, polyester or polypropylene, and the like for example, or it could be a cellulose ester membrane cast on a hydrophilic support such as cotton or paper.

Polymer Coating

The dense or skin layer of a cellulosic membrane formed by the immersion precipitation process as described above may be coated with a very thin hydrophilic dense layer of a polymer. It is this thin coating of the polymer which will then become the dense rejection layer.

Applying a thin coating to a dense or skin layer of a cellulosic membrane has been pioneered for gas separation membranes, such as in U.S. Pat. No. 4,230,463 to Henis, Tripodi, which is hereby incorporated by reference. In this procedure the cellulosic membrane is dried by first replacing the bound water with alcohol, then replacing the alcohol with hexane. The polymer to be coated on the membrane is then dissolved in hexane and applied to the membrane surface after which the hexane is removed by evaporation.

In gas separation membranes a 0.2 micron layer of silicone rubber is commonly used. However, this rubber is not appropriate for FO or PRO because silicone rubber is hydrophobic and in FO or PRO the dense layer must be hydrophilic.

Accordingly, for other applications the applied polymer can be pH resistant, hydrophilic, and pliable. An example of such a polymer which can be applied by the hexane coating process described above is a sulfonated polystyrene polyisobutylene block copolymer disclosed in U.S. Pat. No. 6,579,984, Tan et al., which is hereby incorporated by reference. This polymer is rubbery, hydrophilic, dense enough to provide RO level separations, and tolerant to pH over 12. Coatings of thicknesses less than one (1) micron are readily achievable.

Many additional implementations are possible.

Membrane Hydrolyzation

Once coated with a very thin hydrophilic dense layer of a more pH tolerant polymer, the membrane may be rewetted with water. The cellulosic portion of the membrane may then be rendered more open by hydrolysis.

In this process some or all of the acetate groups that are esterifies to cellulose are replaced with hydroxyl groups by exposure of the membrane to a solution with a pH over 12. After hydrolysis the membrane has a dense rejection layer less than one (1) micron in thickness supported by a very hydrophilic, asymmetric ultrafiltration membrane.

This membrane can be strengthened as needed for PRO by inclusion of cellulose acetate butyrate in the cellulose acetate mixture of the membrane cast by the immersion precipitation process.

Many additional implementations are possible. Further implementations are within the CLAIMS.

Specifications, Materials, Manufacture, Assembly

It will be understood that implementations are not limited to the specific components disclosed herein, as virtually any components consistent with the intended operation of a gas separation membrane may be utilized. Accordingly, for example, although particular components and so forth, are disclosed, such components may comprise any shape, size, style, type, model, version, class, grade, measurement, concentration, material, weight, quantity, and/or the like consistent with the intended operation of a gas separation membrane implementation. Implementations are not limited to uses of any specific components, provided that the components selected are consistent with the intended operation of a gas separation membrane implementation.

Accordingly, the components defining any a gas separation membrane implementation may be formed of any of many different types of materials or combinations thereof that can readily be formed into shaped objects provided that the components selected are consistent with the intended operation of a polymer coated hydrolyzed membrane implementation. As a restatement of or in addition to what has already been described and disclosed above, the FO or PRO membrane may be made from a thin film composite RO membrane. Such membrane composites include, for example, a membrane cast by an immersion precipitation process (which could be cast on a porous support fabric such as woven or nonwoven nylon, polyester or polypropylene, or preferably, a cellulose ester membrane cast on a hydrophilic support such as cotton or paper). The membranes used may be hydrophilic, membranes with salt rejections in the 80% to 95% range when tested as a reverse osmosis membrane (60 psi, 500 PPM NaCl, 10% recovery, 25. degree. C.). The nominal molecular weight cut-off of the membrane may be 100 daltons. The membranes may be made from a hydrophilic membrane material, for example, cellulose acetate, cellulose proprianate, cellulose butyrate, cellulose diacetate, blends of cellulosic materials, polyurethane, polyamides. The membranes may be asymmetric (that is, for example, the membrane may have a thin rejection layer on the order of one (1) or less microns thick and a dense and porous sublayers up to 300 microns thick overall) and may be formed by an immersion precipitation process. The membranes are either unbacked, or have a very open backing that does not impede water reaching the rejection layer, or are hydrophilic and easily wick water to the membrane. Thus, for mechanical strength they may be cast upon a hydrophobic porous sheet backing, wherein the porous sheet is either woven or non-woven but having at least about 30% open area. The woven backing sheet may be a polyester screen having a total thickness of about 65 microns (polyester screen) and total asymmetric membrane is 165 microns in thickness. The asymmetric membrane may be cast by an immersion precipitation process by casting a cellulose material onto a polyester screen. The polyester screen may be 65 microns thick, 55% open area.

Various gas separation membrane implementations may be manufactured using conventional procedures as added to and improved upon through the procedures described here.

Use

Implementations of a polymer coated hydrolyzed membrane are particularly useful in gas separation applications. One application of particular interest is the removal of $CO_2$ from natural gas. Many natural gas sources are too high in $CO_2$ to be allowed into the natural gas pipeline grid.

However, implementations are not limited to uses relating to gas separation applications. Rather, any description relating to gas separation applications is for the exemplary purposes of this disclosure, and implementations may also be used with similar results in a variety of other applications.

In places where the description above refers to particular implementations, it should be readily apparent that a number of modifications may be made without departing from the spirit thereof and that these implementations may be alternatively applied. The accompanying CLAIMS are intended to cover such modifications as would fall within the true spirit and scope of the disclosure set forth in this document. The presently disclosed implementations are, therefore, to be considered in all respects as illustrative and not restrictive, the scope of the disclosure being indicated by the appended CLAIMS rather than the foregoing DESCRIPTION. All changes that come within the meaning of and range of equivalency of the CLAIMS are intended to be embraced therein.

The invention claimed is:

1. A method of forming a gas separation membrane by immersion precipitation and hydrolysis comprising:
    depositing a first hydrophilic polymer solution with a formulation optimized to produce a high performance porous layer;
    depositing on top of the first hydrophilic polymer solution a second, different hydrophilic polymer solution optimized to produce a high performance dense layer, thereby forming a two-layer polymer solution;
    forming the two-layer polymer solution into one of a forward osmosis membrane and a pressure retarded osmosis membrane by bringing the second, different hydrophilic polymer solution into contact with water to form the dense layer;
    coating one of the forward osmosis membrane and the pressure retarded osmosis membrane with a thin layer of a third, different, hydrophilic polymer more pH tolerant than the first and second hydrophilic polymer solutions to form a dense rejection layer thereon; and
    exposing one of the coated forward osmosis membrane and the coated pressure retarded osmosis membrane to a high pH solution, thereby rendering the porous and dense layers more open by hydrolysis.

2. The method of claim 1, wherein forming the two-layer polymer solution into one of a forward osmosis membrane and a pressure retarded osmosis membrane comprises forming the two-layer polymer solution into one of an asymmetric forward osmosis membrane and an asymmetric pressure retarded osmosis membrane by bringing the second, different hydrophilic polymer solution into contact with water to form the dense layer.

3. The method of claim 2, wherein forming the two-layer polymer solution into one of an asymmetric forward osmosis membrane and an asymmetric pressure retarded osmosis membrane comprises forming the dense layer comprising a thickness of about 5 to about 15 microns and the porous layer comprising a thickness of about 20 to about 150 microns.

4. The method of claim 2, wherein forming the two-layer polymer solution into one of an asymmetric forward osmosis membrane and an asymmetric pressure retarded osmosis membrane comprises forming the dense layer comprising a density of polymer of about 50% or greater polymer by volume and the porous layer comprising a density of polymer from about 15% to about 30% polymer by volume.

5. The method of claim 2, wherein:
depositing a first hydrophilic polymer solution comprises depositing a first cellulose acetate butyrate solution;
depositing on top of the first hydrophilic polymer solution a second, different hydrophilic polymer solution comprises depositing on top of the first cellulose acetate butyrate a second cellulose triacetate solution, thereby forming a two-layer polymer solution; and
forming the two-layer polymer solution into one of an asymmetric forward osmosis membrane and an asymmetric pressure retarded osmosis membrane comprises forming the two-layer polymer solution into one of an asymmetric forward osmosis membrane and an asymmetric pressure retarded osmosis membrane by bringing the second cellulose triacetate solution into contact with water to form the dense layer.

6. The method of claim 2, wherein coating one of the forward osmosis membrane and the pressure retarded osmosis membrane comprises coating one of the asymmetric forward osmosis membrane and the asymmetric pressure retarded osmosis membrane with a thin layer of a third sulfonated polystyrene polyisobutylene block copolymer to form a dense rejection layer thereon.

7. The method of claim 6, wherein coating one of the asymmetric forward osmosis membrane and the asymmetric pressure retarded osmosis membrane comprises coating one of the asymmetric forward osmosis membrane and the asymmetric pressure retarded osmosis membrane with a layer of a third sulfonated polystyrene polyisobutylene block copolymer having a thicknesses of about 1 micron or less.

8. The method of claim 1, wherein:
depositing a first hydrophilic polymer solution comprises depositing a first cellulose acetate butyrate solution;
depositing on top of the first hydrophilic polymer solution a second, different hydrophilic polymer solution comprises depositing on top of the first cellulose acetate butyrate a second cellulose triacetate solution, thereby forming a two-layer polymer solution; and
forming the two-layer polymer solution into one of a forward osmosis membrane and a pressure retarded osmosis membrane comprises forming the two-layer polymer solution into one of a forward osmosis membrane and a pressure retarded osmosis membrane by bringing the second cellulose triacetate solution into contact with water to form the dense layer.

9. The method of claim 1, wherein coating one of the forward osmosis membrane and the pressure retarded osmosis membrane comprises coating one of the forward osmosis membrane and the pressure retarded osmosis membrane with a thin layer of a third sulfonated polystyrene polyisobutylene block copolymer to form a dense rejection layer thereon.

10. The method of claim 9, wherein coating one of the forward osmosis membrane and the pressure retarded osmosis membrane comprises coating one of the forward osmosis membrane and the pressure retarded osmosis membrane with a layer of a third sulfonated polystyrene polyisobutylene block copolymer having a thicknesses of about 1 micron or less.

11. A gas separation membrane comprising:
a porous layer formed from a first hydrophilic polymer solution by immersion precipitation and from hydrolysis with a formulation and optimized to produce a high performance porous layer;
a dense layer on top of and supported by the porous layer, the dense layer formed from a second, different hydrophilic polymer solution by immersion precipitation and from hydrolysis and optimized to produce a high performance dense layer; and
a dense rejection layer applied onto the dense layer and formed from a third hydrophilic polymer more pH tolerant than the first and second hydrophilic polymer solutions.

12. The membrane of claim 11, wherein the membrane is an asymmetric membrane.

13. The membrane of claim 12, wherein the dense layer comprises a thickness of about 5 to about 15 microns and the porous layer comprises a thickness of about 20 to about 150 microns.

14. The membrane of claim 12, wherein the dense layer comprises a density of polymer of about 50% or greater polymer by volume and the porous layer comprises a density of polymer from about 15% to about 30% polymer by volume.

15. The membrane of claim 12, wherein the asymmetric membrane comprises one of an asymmetric forward osmosis membrane and an asymmetric pressure retarded osmosis membrane with the porous layer formed from a first cellulose acetate butyrate solution and the dense layer formed from a second cellulose triacetate solution.

16. The membrane of claim 12, wherein the dense rejection layer is formed from a sulfonated polystyrene polyisobutylene block copolymer.

17. The membrane of claim 16, wherein the dense rejection layer has a thicknesses of about 1 micron or less.

18. The membrane of claim 11, wherein the membrane comprises one of a forward osmosis membrane and a pressure retarded osmosis membrane with the porous layer formed from a first cellulose acetate butyrate solution and the dense layer formed from a second cellulose triacetate solution.

19. The membrane of claim 11, wherein the dense rejection layer is formed from a sulfonated polystyrene polyisobutylene block copolymer.

20. The membrane of claim 19, wherein the dense rejection layer has a thicknesses of about 1 micron or less.

* * * * *